(12) United States Patent
Bala et al.

(10) Patent No.: US 8,059,134 B2
(45) Date of Patent: Nov. 15, 2011

(54) ENABLING COLOR PROFILES WITH NATURAL-LANGUAGE-BASED COLOR EDITING INFORMATION

(75) Inventors: Raja Bala, Webster, NY (US); Geoffrey J Woolfe, Hamlyn Heights (AU)

(73) Assignee: Xerox Corporation, Norwalk, CT (US)

( * ) Notice: Subject to any disclaimer, the term of this patent is extended or adjusted under 35 U.S.C. 154(b) by 585 days.

(21) Appl. No.: 12/246,559

(22) Filed: Oct. 7, 2008

(65) Prior Publication Data

US 2010/0086230 A1 Apr. 8, 2010

(51) Int. Cl.
- *G09G 5/00* (2006.01)
- *G09G 5/02* (2006.01)
- *G06K 9/00* (2006.01)
- *G06K 9/40* (2006.01)
- *H04N 5/44* (2006.01)
- *G03F 3/08* (2006.01)
- *G06T 15/10* (2006.01)
- *H04N 9/64* (2006.01)

(52) U.S. Cl. ........ 345/589; 345/591; 345/427; 345/581; 345/604; 348/557; 348/708; 358/518; 358/519; 358/523; 382/162; 382/167; 382/254; 382/274

(58) Field of Classification Search .................. 345/418, 345/427–428, 581, 589–591, 593, 600–601, 345/603–604, 619, 549; 348/557, 582, 708, 348/612; 358/518–519, 523–524, 448, 452; 382/162–167, 254, 274, 276
See application file for complete search history.

(56) References Cited

U.S. PATENT DOCUMENTS

| | | | | |
|---|---|---|---|---|
| 5,646,752 A * | 7/1997 | Kohler et al. | ................. | 358/520 |
| 6,744,448 B1 * | 6/2004 | Bernard et al. | ................ | 715/764 |
| 7,796,299 B1 * | 9/2010 | MacLeod | ........................ | 358/1.9 |
| 2004/0021879 A1 * | 2/2004 | Castelltort et al. | ............. | 358/1.3 |
| 2005/0225782 A1 * | 10/2005 | Livengood et al. | ............ | 358/1.9 |
| 2007/0133024 A1 * | 6/2007 | Kang et al. | ...................... | 358/1.9 |
| 2008/0007749 A1 | 1/2008 | Woolfe | | |
| 2008/0025647 A1 * | 1/2008 | Obrador et al. | ............... | 382/305 |
| 2008/0204774 A1 * | 8/2008 | Matsushima | ................. | 358/1.9 |
| 2009/0073465 A1 * | 3/2009 | Rolleston et al. | ............. | 358/1.9 |
| 2009/0310152 A1 * | 12/2009 | Roulland et al. | ............... | 358/1.9 |
| 2010/0085377 A1 * | 4/2010 | Woolfe | ......................... | 345/594 |
| 2010/0153453 A1 * | 6/2010 | Knowles | ....................... | 707/784 |

* cited by examiner

*Primary Examiner* — Wesner Sajous

(57) ABSTRACT

A method of retaining original natural language commands along with the mathematical LUT transform of the commands and a private tag within the same ICC profile. The private tag can be read only by an exclusive or proprietary application or color management module. When a user loads a color editing profile into the proprietary application, the natural language commands could then be read from the private tag and displayed on a user interface. The user can then immediately see the qualitative effect of the color editing profile and provide selected modifications to the commands and retain a new set of commands stored in another profile.

18 Claims, 2 Drawing Sheets

ENABLING COLOR PROFILES WITH NATURAL-LANGUAGE-BASED COLOR EDITING INFORMATION

The embodiments disclosed herein relate to a color editing system, and more specifically, a user-friendly color editing system.

There are many ways to specify color and color difference. Color imaging scientists and engineers use precise, numeric color specifications based on standardized color spaces and color encodings. Such color specifications are often based on the color matching behavior of a standard human observer and are implemented in device-independent color encodings as well as in device dependent color encodings.

Another form of specifying color is to use color names in natural language as described in pending application U.S. Ser. No. 11/479,484 filed by Geoffrey J. Woolfe, titled: Natural Language Color Communication And System Interface—Publication No. 20080007749, published Jan. 10, 2008, this application being assigned to the same assignee as the present invention and the subject matter of the specification of this application being incorporated herein. Although natural language is a far less precise method of color specification than those discussed above, it is nonetheless the more common method of color specification used by consumers of color.

This method of color specification uses common color names, such as red, green, blue, etc. It also uses combinations of common color names to refine the specification. Examples of such combinations include reddish-brown, greenish-blue, yellowish-green etc. In addition, natural language provides many modifying adjectives or phrases to provide further subtle discrimination in color specification. Examples of such modifying adjectives or phrases include light, dark, bright, saturated, vivid, muddy, moderate, dull, pale, washed-out or "slightly less yellow", "much darker", "more saturated", "greener", "significantly punchier", and "a smidge lighter". While these expressions may not be precise, many people commonly use them to describe how they would like their printed material to be changed to meet their requirements.

Color management calls for the ability to produce consistent, predictable and pleasing color across a wide range of devices, media, halftones, and document types. The requirement for "pleasing color" involves subjective judgment, and depends heavily on the market, the application, and the individual customer. Thus there is invariably a need to offer tools by which customers can edit colors in a document according to their preference and expectation. An easy and intuitive means for controlling colors using natural language constructs (NLC) has been described in the above referenced patent application. In such a system, a graphical interface allows the user to specify the desired colors via a sequence of natural language phrases such as: "Make greens much lighter". These phrases are converted into a mathematical transform such as a 3-dimensional lookup table (LUT), which can then be applied to images, and/or stored in abstract or device International Color Consortium (ICC) profiles. A difficulty with the prior art, however, is that once the mathematical transform is calculated and stored in the profile, there is no straightforward way to retrieve the original NLC representation that produced the transform, other than to analyze the mathematical transform and estimate the language-based edits from which the transform stemmed.

The present invention has multiple aspects such as storing the sequence of color edits in their original language-based form as a private tag in the profile that contains the corresponding mathematical transform. This way, the human-readable (i.e. language-based) and machine-readable (i.e. mathematical) forms of the color edits remain logically and physically connected. It then becomes possible to load the profile into an NLC-enabled application which parses the private tag, displays the color edits in NLC form. Other aspects include enabling the user to modify and save a new set of edits in natural language, to save these edits in both NLC and mathematical forms within the profile, and to load multiple profiles representing different types of color edits, and build composite edits using the language-based interface. The final sequence of edits would again be saved in both NLC and mathematical forms in a new profile.

Note that the NLC representation is far more compact than the mathematical transform. Thus, if the color editing and rendering is occurring entirely within a proprietary color management system, then in principle, the profiles could contain only the compact NLC version of the edits, and the mathematical transform could be computed from the NLC in real-time just prior to a job being rendered (assuming this computation is acceptable relative to the overall RIP and print speed).

Note also that the NLC representation is of high precision, and does not suffer from LUT interpolation/quantization effects. Thus if edits from multiple profiles are to be combined, it is better to do this within the natural language representation, and then compute the composite mathematical transform from this, rather than concatenating the transforms directly. Furthermore, if two edits are in conflict or tension with each other, it is preferable to resolve this in the language representation, rather than in the color transform. As a simple example, if an edit within one profile makes the image "much more contrasty", and an edit from another profile makes the image "much less contrasty", it is more advantageous to flag and resolve these conflicting edits in language form (either automatically or with user intervention), than to run the image through two transforms that are both of high curvature, and thus susceptible to undesirable artifacts.

Embodiments of the present invention include a system for storing a natural-language representation of a sequence of color edits within a profile along with the corresponding mathematical color transform for the same sequence of edits. Another embodiment is similar to the first embodiment where the storing is done within a private tag. The private tag is exclusive to a given vendor proprietary system and therefore readable only by the vendors application. Another embodiment is a system for parsing the private tag, displaying the sequence of language-based edits in a graphical interface, and enabling a user to modify the edits. Further embodiments include systems for loading a plurality of color editing profiles, parsing the respective private tags, displaying the color edits as a series of natural language phrases in a graphical interface, enabling the user to combine and modify edits, and saving the composite edits to a private tag in a new profile. The embodiments of the invention disclosed herein can be used in a range of applications from document creation through proofing and pre-press activities to device control.

Various exemplary embodiments will be described in detail, with reference to the following figures.

In particular, the invention provides an ICC profile containing a color editing transform that produces visually pleasing/preferred images. In particular the transform has been created by an application that translates "Natural Language" color editing commands from a user (e.g. "make the blues brighter") into a mathematical function that has been encoded in a 3-D lookup table (LUT) within the ICC profile. The commands are specified by the user in a sequence, e.g., First command—make blues brighter
Second command—make greens darker
Third command—make reds less colorful Each command is translated to a mathematical function in 3D color space, and in the end, all functions are combined in a suitable fashion into a composite function that captures the effect of all the commands. This function is then used to construct a 3-D LUT. The underlying technology that converts natural language commands into a LUT transform has been captured in the prior art patent application referenced above.

Figure 1:
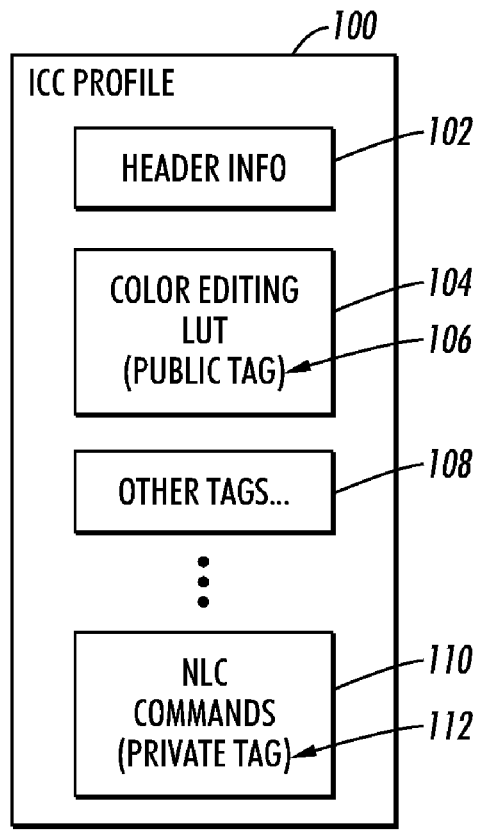
FIG. 1 illustrates an exemplary color editing ICC profile showing tagged data structures.

Turning to the figures, FIG. 1 shows a typical profile, in particular, an ICC profile 100 that can be used in the present invention. ICC profile 100 includes header information 102, a color editing Look Up Table (LUT) 104 with a related public tag 106, other tags 108, Natural Language Constructs (NLC) commands 110 with a related private tag 112.

The term profile generally refers to the International Color Consortium (ICC) profile that is a standard file format for color management. In general, a profile is either resident on a storage device or attached to a computer image file and when necessary, loaded into an area of memory on a computer. The profile contains a series of tags which provide all the parameters and data necessary to perform a color transformation between one color space and another. Examples of such tags include:

(i) 3×3 matrix for performing linear transforms of 3D color data;
(ii) tone-reproduction curve (TRC) for performing 1-D transformations on each channel of multidimensional color input;
(iii) 3-D lookup table (LUT) for performing more complex multidimensional color transforms.

In addition, a profile can contain other auxiliary information such as the particular device or application for which the profile is intended, or the measurements from which the transforms are derived. There are different types of profiles. "Device profiles" contain transformations between a device independent or visually based color space (such as CIELAB) and the colors used by a particular device (e.g. CMYK for printers, RGB for scanners and displays). A device-link profile can be used to encode a general color transformation from one color space to another. An abstract profile can be used to modify colors by defining a transformation of colors within the device independent Profile Connection Space (PCS) defined by the ICC. In general, the color editing transforms applicable in this invention are not limited, but would most likely be encoded in an abstract profile.

Figure 2:
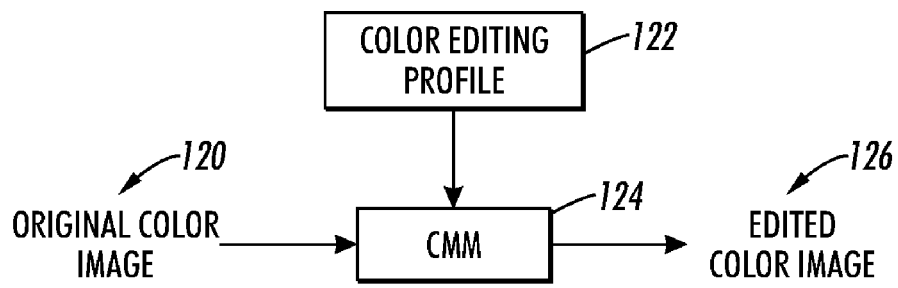
FIG. 2 is a functional diagram illustrating the transformation of the colors of an image using an ICC profile.

FIG. 2 illustrates a functional diagram showing a process of using an ICC profile to transform an image. Specifically, an original color image 120 and a color editing profile 122 are loaded into an appropriate Color Management Module (CMM) 124 to produce an edited color image 126. In general, in a color management system, a color transformation engine referred to as a "color management module" (CMM) retrieves an input image and the appropriate ICC profile, and applies to the image pixels, the color transformations contained in the profile. The result is a color-transformed image, which can then be stored, or subject to subsequent operations in the image path, or rendered on some device. A CMM can exist within common desktop operating systems such as Windows and Macintosh. A Dedicated CMM is also offered by several vendors (e.g. Adobe).

The loading of a profile and invoking of the CMM to apply the conversions in the profile to an image are commonly done through some color imaging application. Examples of such applications include Adobe Photoshop and X-Rite Monaco Profiler.

Figure 3:
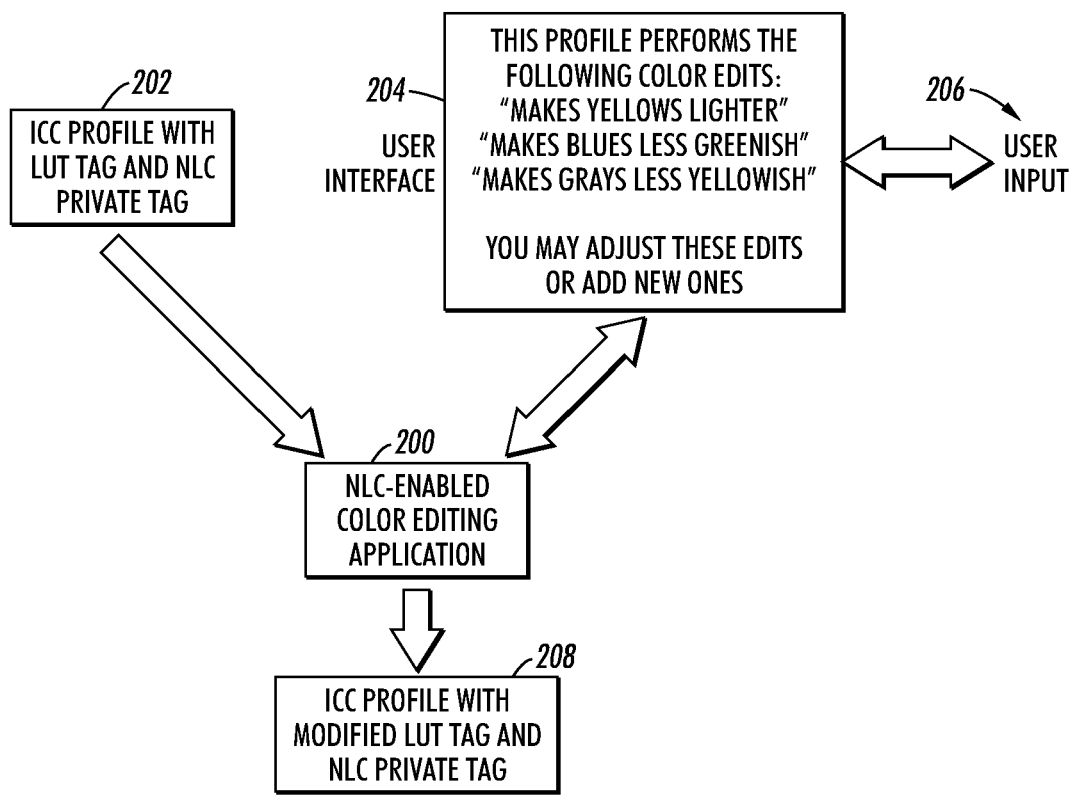
FIG. 3 is a broad flow chart showing a general process for color editing in accordance with the present invention.

With reference to FIG. 3, there is illustrated the general architecture and workflow in accordance with the present invention. Within an ICC profile, various tags can be classified as public tags and private tags Public tags can be read and interpreted by any standard CMM. Private tags can only be read and interpreted by a special CMM (invariably one created by the same vendor who defines and writes the private tag to a profile). Private tags may be used to store special information that aids the quality or performance of a color transformation, and as such, provides a way for a vendor to retain value-added differentiation while complying with an industry standard. As shown, a natural-language-color (NLC) enabled color editing application, block 200 reads in the NLC private tag of an ICC profile, block 202, displays the editing commands in an exemplary user interface, block 204, accepts revised edits from the user 206 via the same interface 204, and writes out a new ICC profile with modified LUT and NLC tags, block 208.

Figure 4:
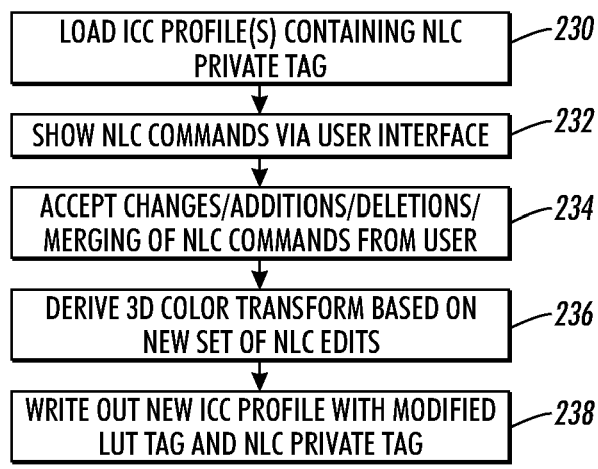
FIG. 4 is a flow diagram of an editing process in accordance with the present invention.

With reference to FIG. 4, there is shown a flow diagram in accordance with the present invention. IN block 230, ICC profiles with NLC private tags are loaded into a suitable color management module and the Natural Language Color commands corresponding to the private tags are displayed in a suitable user interface, as shown in block 232. An interface user provides selected changes, additions, deletions and merger of given commands to create a new set of commands (an edit) as illustrated in block 234. In block 236, new color transforms are provided for the new set of commands and a new ICC profile is written with modified look up table and new NLC private tag as shown in block 238.

It should be noted that the present invention as disclosed in embodiments herein may possibly be extended beyond color control systems and methods of controlling color. Modification and control of other image processing operations may also benefit from a natural language command interface.

The color control system described herein is one application of a natural language command system. It is foreseen that the natural language color modification method disclosed herein may work for other properties as well as color and that the invention also encompasses modifications to documents based upon natural language commands beyond color control systems.

It will be appreciated that the above-disclosed features and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. In a color management system including a processor, a user interface, and memory storing color profiles with mathematical transforms to perform a color transformation of an image, a method of image editing including the steps of:

providing natural language commands at the user interface for image editing, converting the natural language commands to mathematical transforms and storing the transforms in a color profile for color transformation, and storing the natural language commands in the same color profile with the corresponding mathematical transforms.

2. The method of claim 1 wherein the natural language commands are stored in a tag associated with the color profile including the steps of:

reading the private tag, and responsive to reading the private tag, displaying the natural language based commands in a user interface.

3. The method of claim 1 wherein the step of providing natural language commands at the user interface enables a user to determine the effect of a color profile on an image without processing the image.

4. The method of claim 2 further comprising the steps of selectively editing the natural language commands, and storing the edited natural language commands in a tag of a color profile.

5. The method of claim 4 further comprising the steps of:

using the edited natural language commands to create corresponding mathematical transforms, and storing the mathematical transforms within the color profile.

6. In a color management imaging system with memory and a user interface having a color profile to perform a color transformation of an image, a method of editing an image including the steps of:

providing the color profile with a private tag, the private tag capable of being interpreted by an exclusive color management module, the private tag including natural language commands, loading a profile into an exclusive color management module, reading the private tag, editing the natural language commands within the private tag to provide an edited set of natural language commands, and storing the edited natural language commands in a private tag of a color profile.

7. The method of claim 6 including the step of deriving a set of mathematical transforms based from said edited natural language based commands and including these in the private tag of the profile along with the adjusted set of natural language commands.

8. In a natural language based color management system including color profiles in memory and a user interface, a method of providing editing of the color profiles including the steps of:

storing a first set of natural language commands in a first color profile for providing a first color modification of a document, storing mathematical transforms of the first set of natural language commands in the color profile, accessing the color profile to display the first set of natural language commands, and selectively changing the first set of natural language commands to a second set of natural language commands.

9. The method of claim 8 wherein the step of accessing the profile includes the step of displaying the first sequence of natural language commands for selective editing.

10. The method of claim 9 including the step of providing a first tag to the profile wherein the tag restricts access of the natural language commands to a specific natural language based system.

11. The method of claim 8 including the steps of changing the first sequence of natural language commands to a second sequence of natural language commands and storing the second sequence of natural language commands in a new profile.

12. The method of claim 8 including the steps of providing new mathematical transforms in relation to the second set of natural language commands and storing the new mathematical transforms in the second color profile.

13. In a natural language based color editing system including user interface and memory having a plurality of color editing profiles, each of the profiles including a tag, the tag providing access to a natural language command sequence, a method of editing the profiles including the steps of:

loading color editing profiles into the user interface, reading the tags of the color editing profiles to display the natural language command sequences, providing a composite sequence from the displayed natural language command sequences, and saving the composite sequence in a new profile.

14. The method of claim 13 further comprising selectively modifying the composite sequence.

15. The method of claim 13 including the step of providing a private tag for the composite sequence, the private tag identifying an exclusive color management module.

16. The method of claim 13 wherein the step of providing a composite sequence includes the options of combining selected natural language command sequences and portions of natural language command sequences.

17. In an imaging system having a user interface, method of providing a natural language color editing system including the steps of:

providing a set of natural language commands, relating each of the natural language commands with a mathematical transform in color space, storing the natural language commands in a tag within a profile, accessing the tag on the user interface to display the natural language commands, and modifying selected natural language commands to provide a second set of natural language commands.

18. The method of claim 17 including the steps of providing a tag to contain the second set of natural language commands and storing the tag in a profile.

* * * * *